United States Patent [19]
Neu

[11] Patent Number: 5,839,337
[45] Date of Patent: Nov. 24, 1998

[54] SEMICONDUCTOR CARRIER STRIP TRIMMING APPARATUS

[76] Inventor: H. Karl Neu, 920 Mcclesfield Rd., Furlong, Pa. 18925

[21] Appl. No.: 671,777

[22] Filed: Jun. 20, 1996

Related U.S. Application Data

[63] Continuation-in-part of Ser. No. 430,436, Apr. 28, 1995, abandoned.

[51] Int. Cl.$^6$ .............................. B65B 61/08; B23D 47/04
[52] U.S. Cl. ................................. 83/255; 83/35; 83/404; 83/418; 83/451; 83/488; 83/614; 83/630; 83/945
[58] Field of Search .................................. 83/35, 43, 47, 83/404, 404.2, 418, 425.2, 425.3, 425.4, 471.2, 483, 484, 485, 487, 488, 489, 508.3, 620, 945, 249, 255, 451, 614

[56] References Cited

U.S. PATENT DOCUMENTS

| | | | |
|---|---|---|---|
| 892,039 | 6/1908 | Fischer et al. | 83/404.2 X |
| 1,986,769 | 1/1935 | Farley et al. | 83/404 X |
| 2,129,116 | 9/1938 | Buffehr | 83/404.2 X |
| 2,156,247 | 4/1939 | Smith | 83/404.2 X |
| 2,169,133 | 8/1939 | Barr | 83/404.2 |
| 2,669,262 | 2/1954 | Stevens | 83/488 X |
| 2,766,511 | 10/1956 | Lamoureux | 83/488 X |
| 2,803,273 | 8/1957 | Ramsey et al. | 83/425.3 |
| 3,762,251 | 10/1973 | Madsen et al. | 83/945 X |
| 3,818,790 | 6/1974 | Culp et al. | 83/408 |
| 4,031,789 | 6/1977 | Soodalter | 83/404.2 |
| 4,187,755 | 2/1980 | Shirai | 83/487 X |
| 4,579,030 | 4/1986 | Haas, Sr. et al. | 83/404.2 |
| 4,748,797 | 6/1988 | Martin | 83/408 X |
| 5,397,106 | 3/1995 | Hill | 83/408 X |

FOREIGN PATENT DOCUMENTS

| | | |
|---|---|---|
| 0 186 201 | 7/1986 | European Pat. Off. . |
| 2455858 | 1/1981 | France ..................................... 83/487 |
| 3540448 | 5/1987 | Germany ................................ 83/404 |
| 1 454 383 | 11/1976 | United Kingdom . |
| 2 175 836 | 12/1986 | United Kingdom . |

*Primary Examiner*—Clark F. Dexter
*Attorney, Agent, or Firm*—Synnestvedt & Lechner

[57] ABSTRACT

A pallet for supporting strip material on which encapsulated circuit devices of the ball-grid array type are supported is delivered to a first cutter assembly. Rotary hardened steel cutter discs having radially extended cutting teeth separate the circuit devices as the cutter assembly is traversed to move the cutter blades in paths extended transversely of the strip material between adjacent circuit devices. Thereafter, the pallet is moved to a second cutter station at which a second cutter assembly trims strip material along paths extending transversely of the first paths. Pallet positioning means for precise positioning of pallets carrying the strip material include elevators having resilient supports which allow for limited lateral motion of the pallets as they are moved into positions of alignment with the cutter assemblies. The elevators further comprise negative pressure devices operable following pallet alignment for applying negative pressure to the circuit devices for holding the circuit devices in positions of alignment with the cutter blades during the cutting operations.

14 Claims, 11 Drawing Sheets

SEMICONDUCTOR CARRIER STRIP TRIMMING APPARATUS

RELATED APPLICATIONS

This is a continuation-in-part of U.S. Ser. No. 08/430,436, filed Apr. 28, 1995, now abandoned.

FIELD OF THE INVENTION

This invention relates to the cutting or trimming of strip material, especially the trimming of carrier strips used in the fabrication of over-molded ball-grid array type circuit devices.

BACKGROUND OF THE INVENTION

In the manufacture of circuit devices of the so-called ball-grid array type, a plurality of circuit devices are formed on a substrate which comprises a ribbon or strip of a reinforced thermosetting resin material. Electrically conductive copper traces extend through the substrate to selected conductive contact members on the opposite side from the circuit device. The contacts, termed balls due to their bead or ball-like appearance, are arranged in rows to form a grid with the selected contacts providing a part of an electrical circuit path with other circuit devices within an overall circuit package. After the manufacture of the circuit devices on the carrier strip, the circuit devices are then encapsulated within a charge of an encapsulating resin such as an epoxy. Thereafter, the devices, which are arranged on the ribbons or strips in one or more rows, must be separated and the excess strip material trimmed off as close as is practical to each device.

In the separation of such devices, die cutters are usually employed. Difficulties have been encountered in the cutting process as the die cutters tend to compress the relatively thick resinous strip material and this compression, in turn, bends and breaks the copper traces which connect the circuit devices to selected contacts within the grids of contacts on the bottom surface of the strip material. The excess heat generated by some types of cutters may damage the delicate circuitry. As a result, there has been a long felt need in the industry for ways to reduce the unacceptable number of non-functional circuit devices caused as a result of the use of prior art cutter devices.

SUMMARY AND OBJECTS OF THE INVENTION

The present invention provides highly effective apparatus for separating and trimming around circuit devices formed on relatively compressible strip material. This is accomplished in a way which minimizes heat build up, provides a precision cut accurately spaced from the encapsulated devices and avoids compression or tearing of the strip material.

The primary objective of the invention is the substantial reduction of damage to the circuit devices and the copper traces extending through the strip material as caused by known prior techniques and equipment. Related objectives are the provision of a positioning fixture for the precision positioning of the circuit devices relative to the cutting apparatus during cutting and trimming operations, the elimination of defective circuit devices, in general, and the provision of means for rapidly, efficiently and economically separating and trimming circuit devices formed on relatively compressible non-metallic, strip-type substrate material.

The invention is intended for use with automated feed equipment resulting in higher product rates, reduced physical handling of product and reduced costs as compared to known existing equipment.

In summary, the invention comprises a carrier for releasably holding plural carrier strips carrying at least one row of spaced, over-molded circuit devices, cutter means including first and second sets of spaced apart rotary cutter blades located at spaced apart stations, means for moving said holding fixture in a first path extending transversely of the first set of rotary cutter blades for cutting the carrier strip material a predetermined distance from a first pair of edges of said circuit devices so as to effect separation of the devices, and means for thereafter moving said holding fixture in a second path extending transversely of the second set of rotary cutter blades for trimming the carrier strip material from a transversely extended pair of edges of said circuit devices so as to remove all unnecessary strip material from the finished devices.

More specifically, in a preferred embodiment of the invention, apparatus for separating and trimming of the circuit devices comprises a pallet including pneumatic means engagable with the encapsulated products for releasably holding one or more carrier strips. A cutting means at a first station having a reciprocatable frame comprises a plurality of rotating circular cutter blades, each having circumferentially spaced cutting teeth. The first reciprocatable frame receives the carrier for movement in a first path so that the teeth project through the plane of each carrier strip supported on the pallet to thereby effect a separation of the circuit devices from each other. Means are provided for limiting the projection of the cutter blades so that only the teeth, as opposed to the blade side edges, extend into the strip material. As the teeth rotate, each tooth draws air into the cut, thereby preventing the generation of heat in an amount liable to damage the delicate circuit devices. The invention further comprises cutting means at a second station having a second reciprocatable frame for moving the carrier in a second path preferably parallel to the first to effect the trimming of the strip material from the circuit devices along lines which are extended transversely of the cut by the cutters in the first path. Means between the first and second stations for rotating the carrier through 90° prior to effecting the second cut is also preferably provided.

A further objective of the invention is the provision of means for accurately registering the pallet with the first and second cutting means comprising an elevator at the cutting stations having means supporting the pallet, moving the pallet on resilient supports into registry with the cutting means, compressing the resilient supports and holding the circuit devices in fixed position on the pallet by suction devices carried by the elevator which are interengagable with the circuit devices when the resilient supports are compressed.

DETAILED DESCRIPTION OF THE PREFERRED EMBODIMENT

Figure 4:
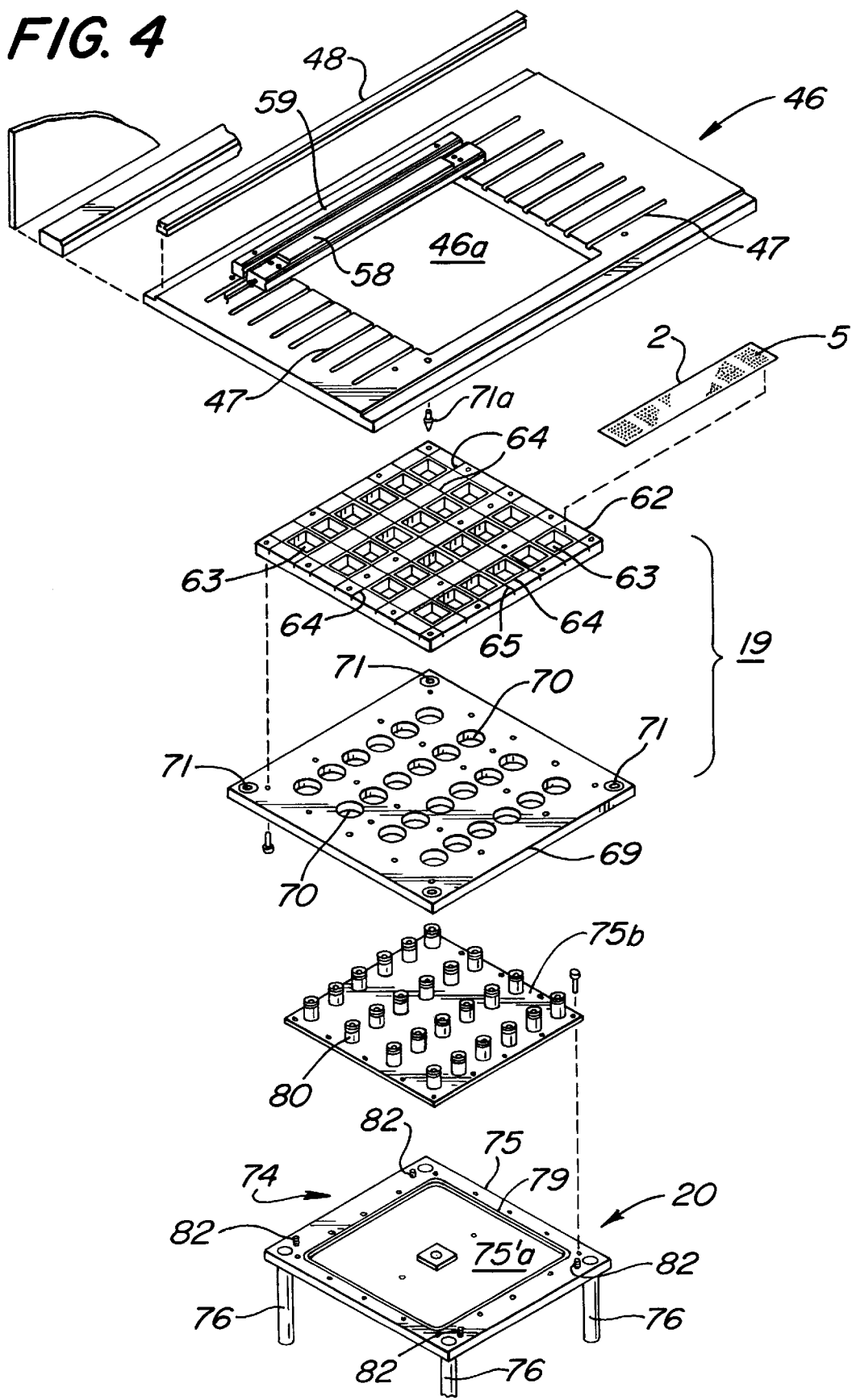
FIG. 4 is an exploded view showing the parts comprising a strip carrier and elevator as located beneath the cutting station of FIGS. 1–3.
Figure 5:
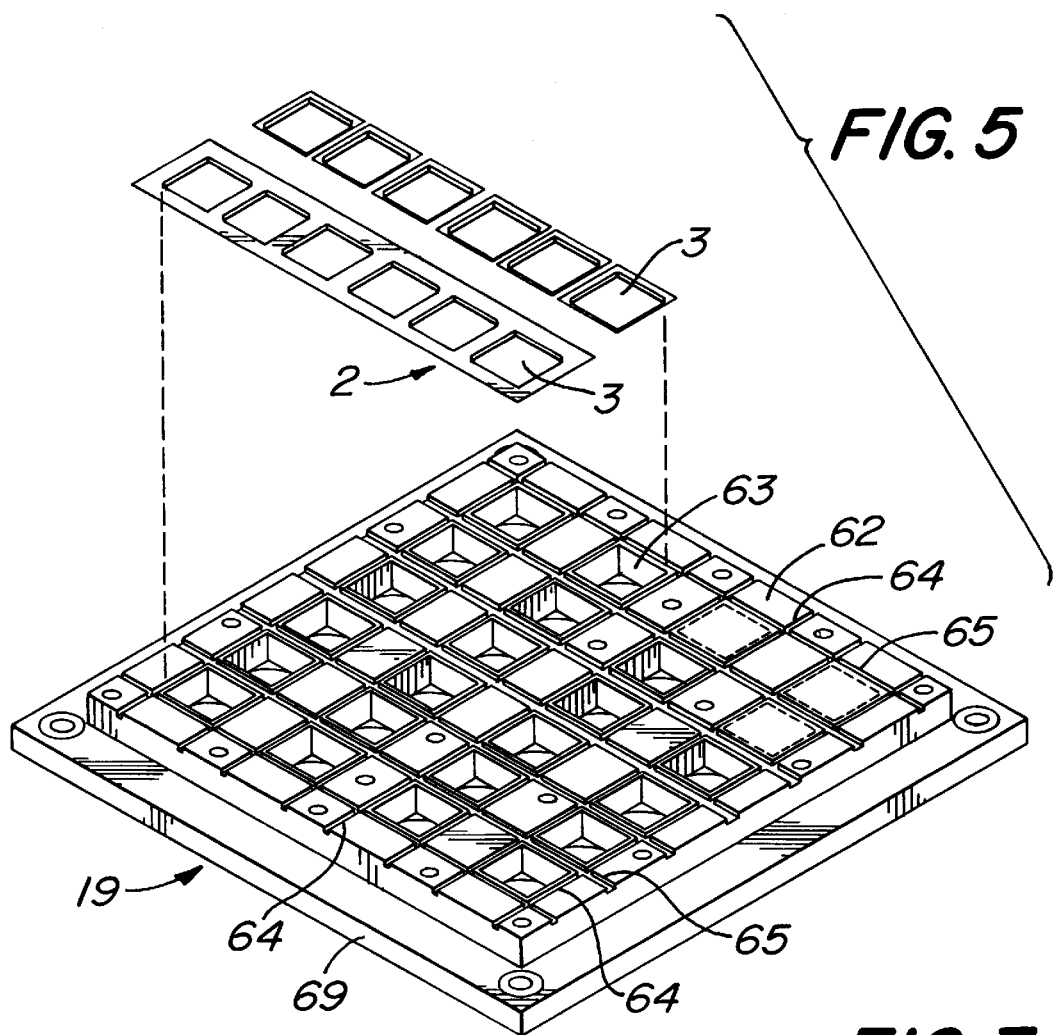
FIG. 5 is an exploded view on an enlarged scale with respect to FIGS. 1–4 showing a strip carrier forming a part of the invention of FIGS. 1–4.
Figure 6:
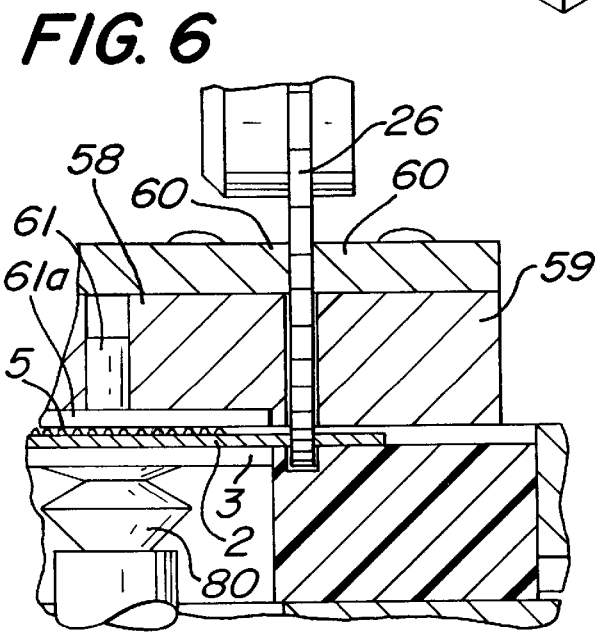
FIG. 6 is a detail view in section on an enlarged scale with respect to FIGS. 1–3 showing the positioning of a single cutter blade of FIGS. 1–3.
Figure 7:
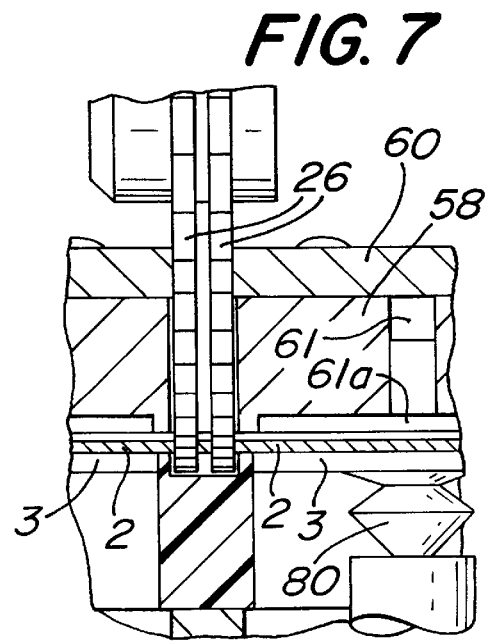
FIG. 7 is a view like FIG. 6 showing the relative positioning of the dual cutter blades of FIGS. 1–3.
Figure 8:
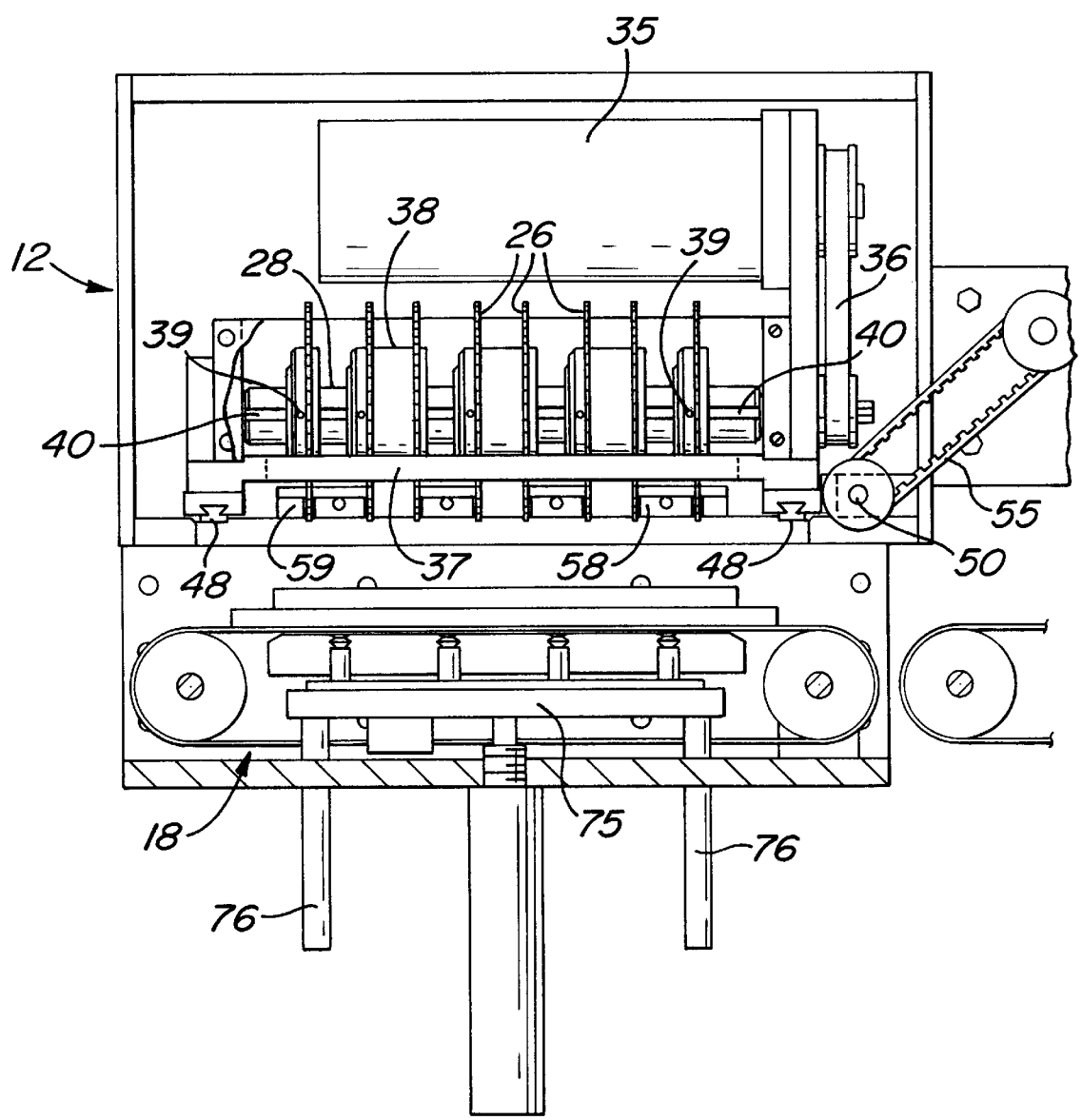
FIG. 8 is an overall frontal view of the second cutting station of the invention.

Attention is first directed to FIGS. 4 and 5 which show a single rectangular carrier strip 2 having six circuit devices 3 over-molded with rectangular charges of resin in accordance with techniques described and claimed, for example, in U.S. Pat. No. 5,405,255, which is incorporated herein by reference. Adjacent to carrier strip 2 in FIG. 5 are six separated and trimmed circuit devices separated and trimmed using equipment and method of the present invention. The opposite side of a strip is shown in FIG. 4 in which the grids of beads or balls 5 oppositely disposed from each encapsulated circuit device can be seen.

Figure 13:
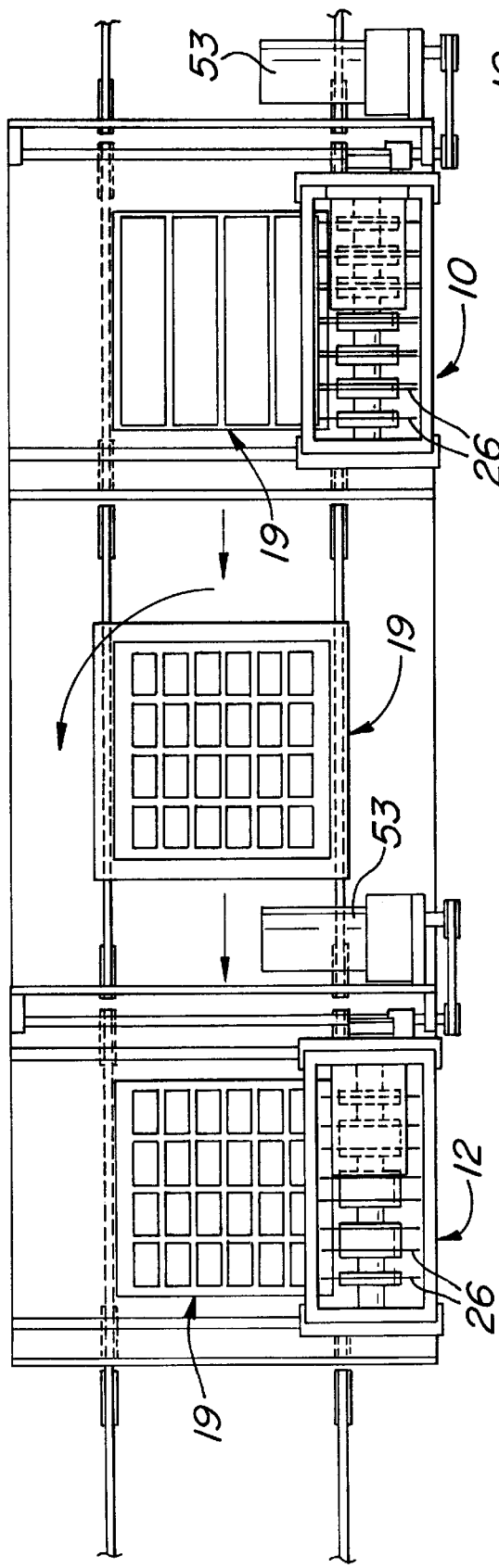
FIGS. 13 and 14 are schematic top and side views respectively, illustrating a typical cutting and trimming cycle.
Figure 14:
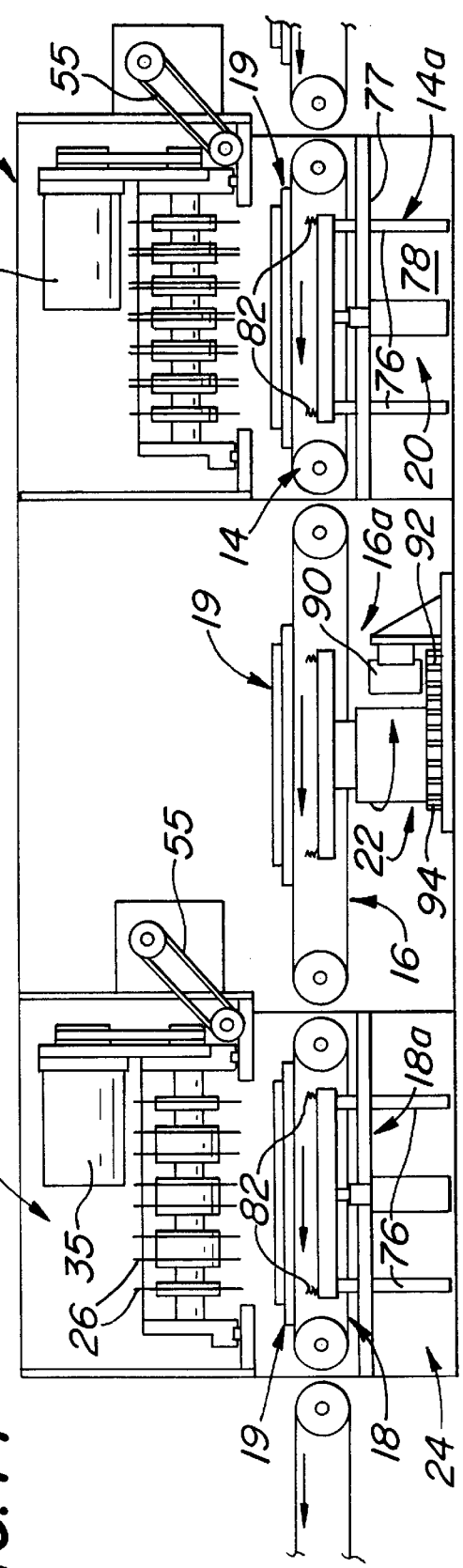

An overall view of the invention can be seen from reference to FIGS. 13 and 14 which show, in schematic form, plan and elevation views of a preferred form of apparatus for carrying out the invention.

The several components of a system incorporating the invention comprise a first cutting station 10, a second cutting station 12 and transport means comprising a plurality of conveyors 14, 16 and 18 which receive and convey carriers 19 for support of a plurality of carrier strips 2 to the first and second stations for separation and trimming along first and second cut lines, respectively. Elevator means 20, 22 and 24 are associated with the conveyors for moving and orienting the carriers at the trimming stations.

Figure 12:
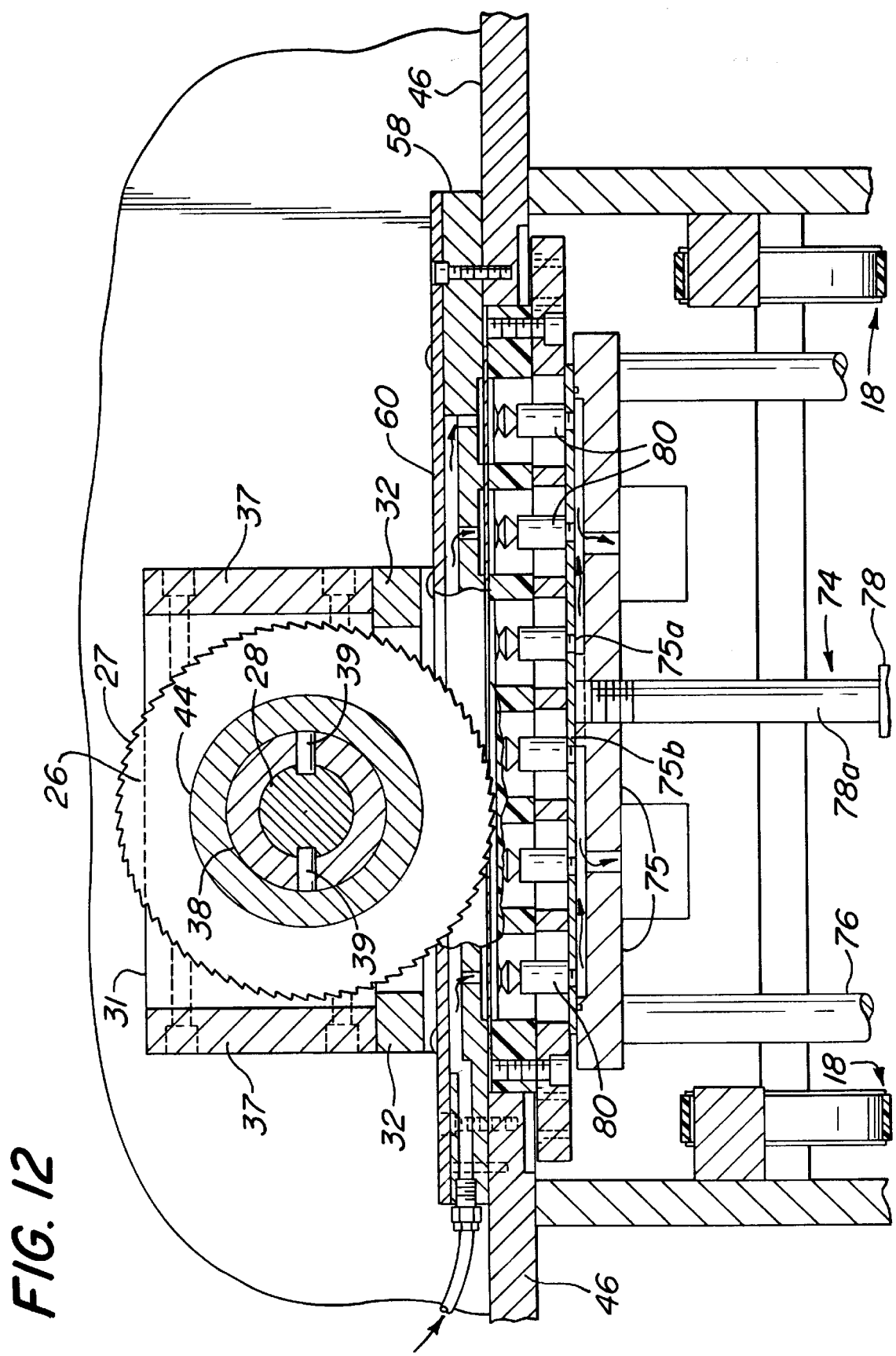
FIG. 12 is a sectional view taken on line 12–12 of FIG. 11.

With reference also to FIGS. 1–7, the first station 10 comprises a cutter assembly which includes a series of spaced apart rotary cutter blades 26 having radially extending teeth 27, illustrated in side view in FIG. 12. Blades 26 are movably mounted to traverse a carrier 19 which has been moved into position beneath the trimming station for separation of the circuit devices by cutting the carrier strip material along parallel spaced apart lines. Preferably, the blades are formed of a material consisting essentially of a carbide steel, providing wear resistance and resisting to tearing of the strip material over prolonged periods of time.

Figure 1:
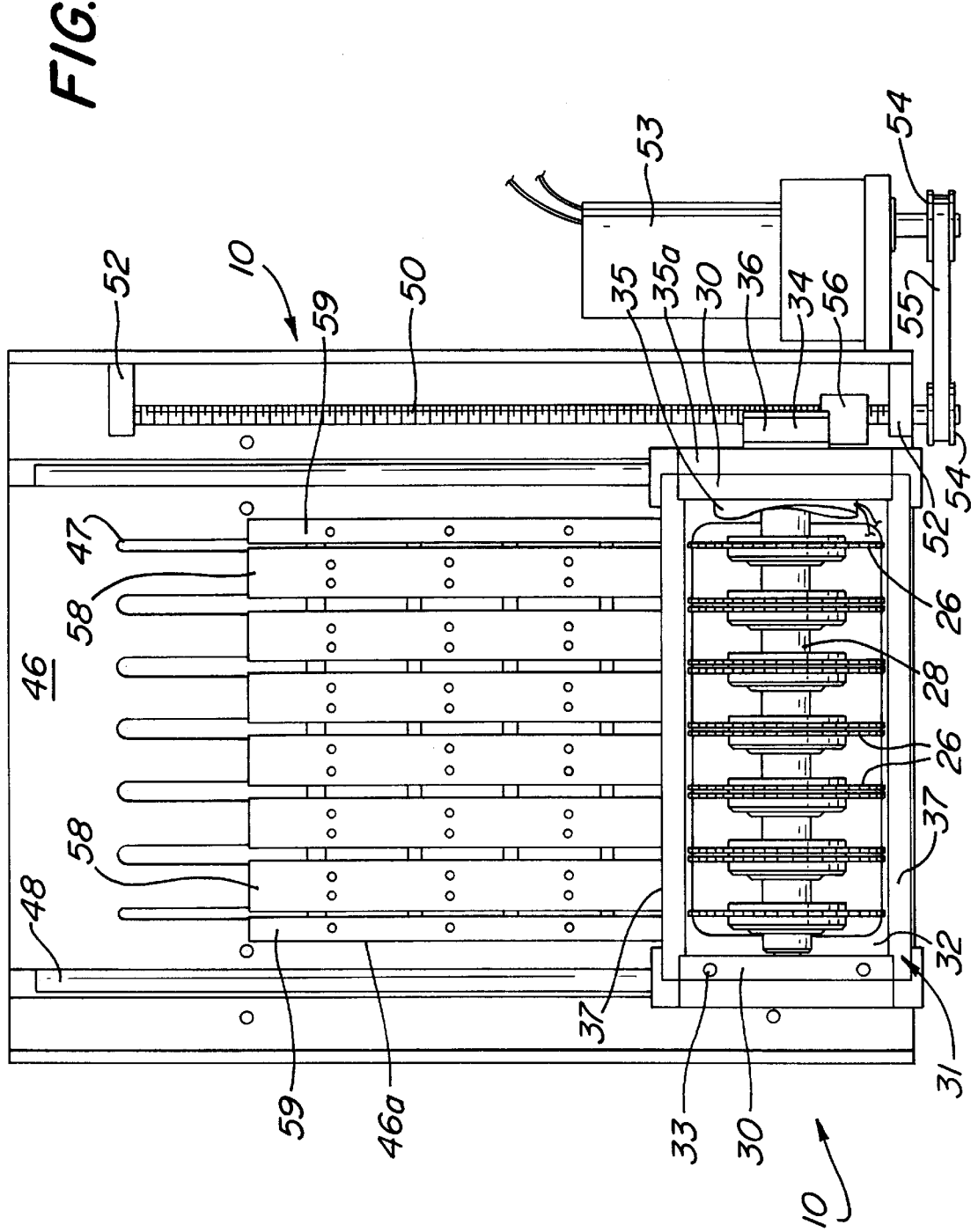
FIG. 1 is a plan view of a first carrier strip cutting station according to the present invention.
Figure 2:
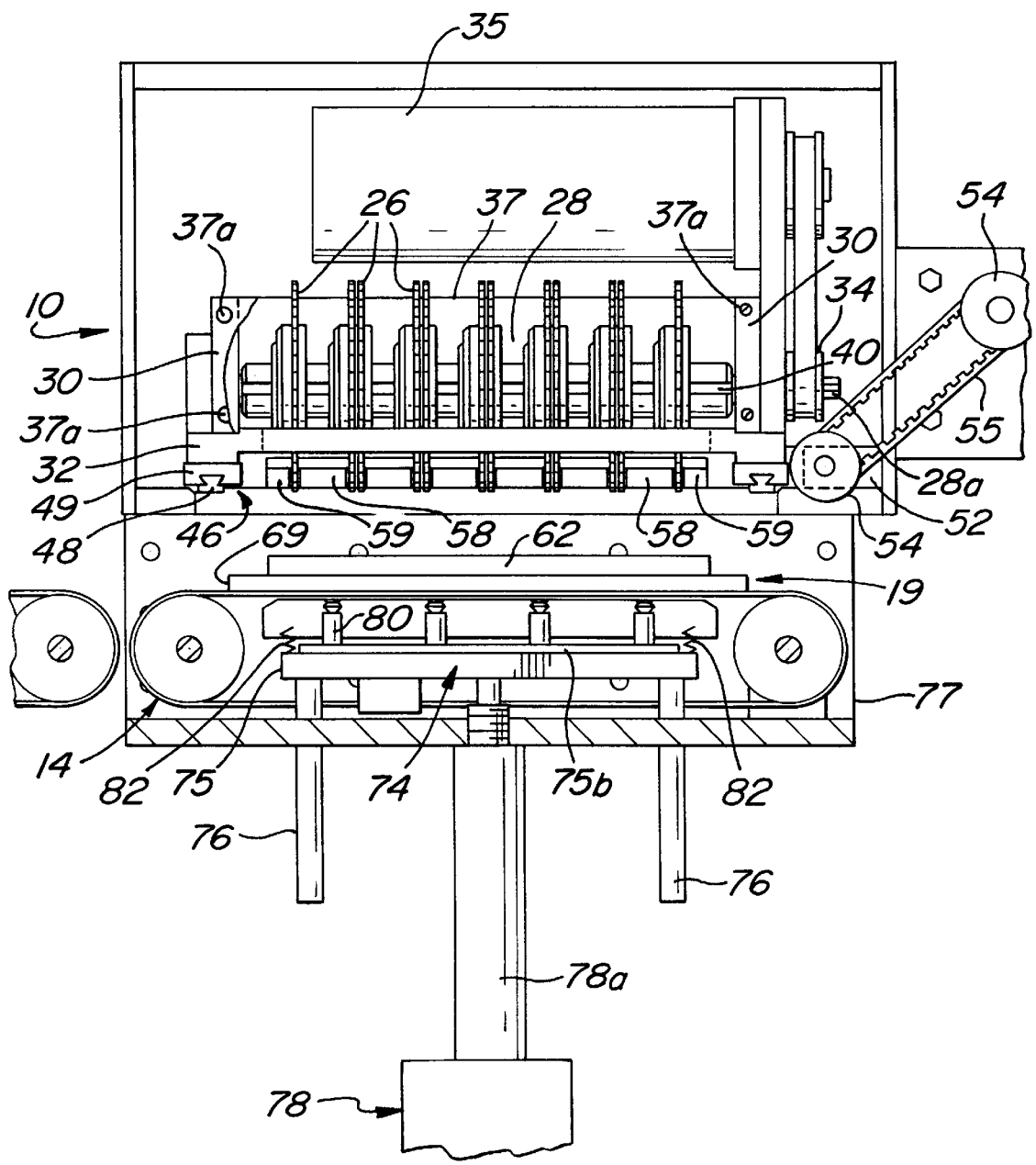
FIG. 2 is a frontal view of the cutting station shown in FIG. 1.
Figure 3:
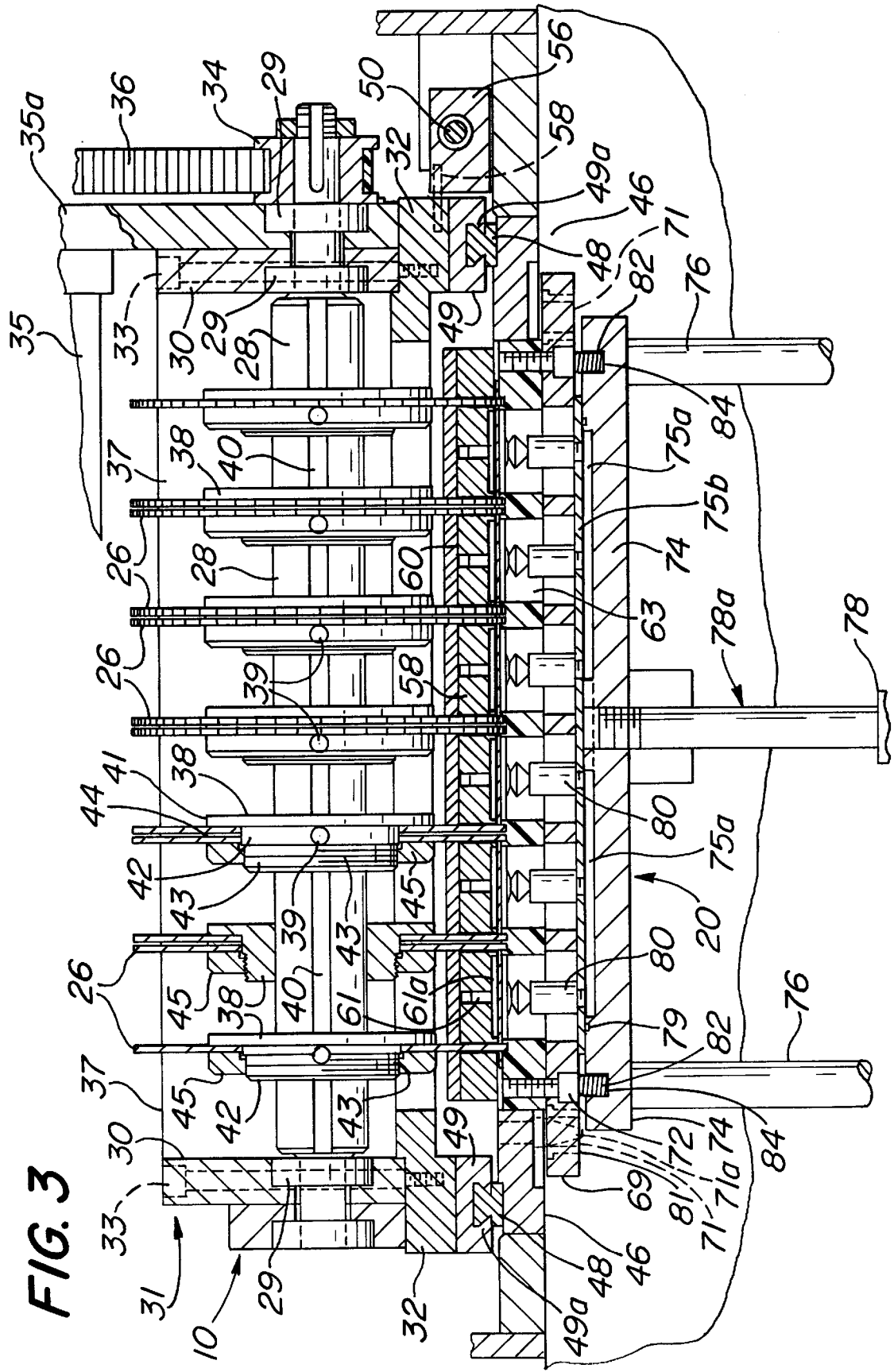
FIG. 3 is an enlarged view, similar to FIG. 2, with portions in section or broken away for purposes of illustration.

As seen in FIGS. 1–3, blades 26 are mounted on a shaft or spindle 28 in predetermined spaced apart relationship. The blades 26 are spaced in pairs with the blades of each pair positioned for making cuts along opposite sides of an encapsulated circuit device. Shaft 28 is, in turn, journaled in bearings 29 (FIG. 3) in the side frame members 30 of a rectangular frame 31. The side frame members 30 are fastened to a base 32 by machine bolts 33. Elongated front and back frame plates 37 interconnect the side frame members by means of machine bolts 37a. Shaft 28 is driven by drive means, including a pulley 34, secured to shaft 28 by a nut 28a. A motor 35 mounted on a support 35a secured to the frame drives shaft by means of drive belt 36.

The means for mounting the rotary cutter blades 26 on shaft 28 are best shown in FIG. 3. Each blade 26 is fitted on a hub 38 which is keyed to shaft 28 by a pair of oppositely disposed pins 39 which project into keyways 40 extending lengthwise of shaft 28 and allow the blades to be shifted lengthwise thereof for positioning where required to make a particular cut. Each hub 38 has a radially extending flange 41 and a cylindrical body portion 42 which is externally threaded at 43. The support hubs for the single blades 26 at the ends of the shaft are dimensioned to support a single blade 26 while the hubs for the blades which are intended to separate the circuit devices, are long enough to support a pair of blades 26 separated by a spacer 44. A threaded nut 45 threaded onto each hub 38 serves as clamping means to hold the blades against relative rotation on the hubs by clamping them against flanges 41. All in all, the cutter assembly at the first station 10 in the illustrative embodiment is comprised of twelve blades spaced to separate the six devices 3, as can be seen in FIG. 5.

The mounting means facilitates blade changes while allowing for accurate spacing of the blades and permits changes in blade spacing when required. In order to change worn blades, it is merely necessary to remove bolts 33 and belt 36 to free the cutter assembly, then removing bolts 37a and pulley 34 to free shaft 28. The hubs 38 are then free to slide off shaft 28. The blades are easily replaced by unloosening nuts 45, then removing the worn blade and mounting a new one in its place.

The first station 10, as illustrated in FIGS. 1–4, further comprises a substantially rectangular support table 46 having a planar upper surface on which the cutter assembly is mounted for reciprocable motion between positions at opposite ends of the table. Table 46 has a square opening 46a, shown in FIG. 4, into which the carriers 19 are sequentially raised and position the carrier strips for cutting and trimming. The table 46 has a plurality of longitudinally extending grooves 47 spaced in alignment with the rotary cutter blades 26 at opposite ends of rectangular opening 46a so as to allow for passage of the teeth of the cutter blades when the blade assembly has been moved into a position beyond either end of opening 46a.

Mounted in parallel relation to the grooves 47 along opposite side edges of table 46 are a pair of cutter assembly support rails 48 which, as shown in FIG. 3, preferably have a dovetail-shaped cross-section. A pair of slides 49 on which the cutter assembly side frame members 32 are mounted are provided with a pair of spaced apart correspondingly shaped dovetail retainer grooves 49a which slidably interfit over the rails 48.

As best shown in FIG. 1, drive means for reciprocating the cutter assembly preferably comprises an elongated drive screw 50 extending parallel to the slides 48. The drive screw is mounted for rotation on a pair of supports 52 secured to one side of table 46. The drive screw is rotatably driven by a motor 53 (FIG. 1) mounted on the frame through a pair of sprockets 54 interconnected by a drive belt 55. A drive nut 56 is threadedly mounted on drive screw 50 and is secured to frame member 32 by a pin 58 (FIG. 3). Upon actuation of motor 53, rotation of drive screw 50 advances the drive nut 56 to move the blade carrier assembly from the position of FIG. 1 to the opposite end of table 46 beyond the back edge of opening 46a. When the assembly reaches the opposite end of the table, means such as a microswitch, not illustrated, is closed to reverse rotation of the motor and cause the drive screw to return the assembly to the initial position of FIG. 1.

As best illustrated in FIGS. 1–4, 6 and 7, elongated blade guides 58 and 59 are mounted in side-by-side relationship on table 46 adjacent to the blades 26 over the opening 46a and the adjacent blade grooves 47. Each blade guide supports a guide cap 60 of bronze or other bearing material whose sidle edges bear against the side surface of the adjacent blade. The guide caps 60 position blades and serve as covers for an internal passage 61 (FIGS. 3, 6 and 7) leading from a source of pressurized air to cavity 61a positioned above the circuit devices. The air under pressure clears the cutters and circuit devices of debris following each cut, as explained hereinafter.

FIGS. 4 and 5 illustrate more particularly a preferred form of carrier 19 for presenting the carrier strips at the cutting stations. The carrier 19 preferably comprises an upper carrier plate or pallet 62 dimensioned to fit within opening 46a in table 46. The pallet 62 supports a plurality of carrier strips, each having a plurality of over-molded semiconductor devices which are placed face downwardly and snugly fit within spaced cavities 63 dimensioned correspondingly to the devices. Although the number of carrier strips and devices on the strips may vary, strips having six devices are typical and one such strip is shown at 2 in FIG. 5. For trimming of such strips, pallet 62 is provided with four rows of rectangular cavities 63 each dimensioned so that an over-molded circuit device 3 on a carrier strip 2 is snugly fitted into a cavity 63 so as to hold it precisely in the desired position for cutting.

Preferably, pallet 62 is formed of a relatively high temperature resistant plastic material, such as polycarbonate, and is further provided with crossing blade guide grooves 64 and 65 spaced in aligned relationship with the cutter blades 26. The carrier 19 further comprises pallet base plate 69 joined to plate 62 by screws or pins 72, as best shown in FIG. 3, having spaced openings 70, shown in FIG. 4, which are each positioned to register with cavities 63. The base plate 69 also has alignment holes 71 adjacent each corner. Two holes 71 at oppositely located corners of the base plate cooperate with alignment pins 71a extending downwardly from the bottom of table 46 in order to accurately position the pallet in relation to the cutters at the cutting stations in a manner explained below.

When the pallet is in the raised position, the upper edge surface of pallet base plate 69 bears against the lower surface of table 46 while the pallet itself fits within the opening 46a.

In order to raise the pallet into the opening 46a, a first elevator 20 (see FIGS. 3, 4 and 14) comprising a rectangular pallet support plate 75 is mounted for vertical movement underneath table 46. Four spaced guide rods 76 slidably mount the plate 75 on a frame 77 (FIG. 2). An air cylinder 78 having a piston rod 78a secured to plate 75 is mounted beneath the plate and lifts the carrier off conveyor 14 and into position in which the carrier strips are properly aligned for cutting.

The elevator further includes negative pressure means for drawing the circuit devices into the cavities 65 and holding them in fixed position until they are properly aligned for cutting at the first station. For this purpose, plate 75 has a depressed central portion 75a (FIGS. 3 and 4) having a port connected to a source of negative pressure. A sealing ring 79 surrounds the recess 75a. A cover plate 75b is fixed to the top of plate 75 so as to cover recess 75a. Suction cups 80 mounted over spaced openings in cover plate 75b communicate with the source of negative pressure. When a pallet is lifted off conveyor 14, the suction cups 80 project through openings 70 into the cavities 63 within pallet 62.

In the position of the elevator shown in FIG. 2, the lower carrier plate 69 of carrier 19 rests on the spaced belts of conveyor 14 and the carrier has been positioned beneath the table in substantial registry with the rectangular opening 46a (FIG. 4). Springs 82 are positioned to engage and resiliently support the house surface 1 of the plate 69. Control means comprising air cylinder 78 and piston 78a lift the strip carrier 19 from the conveyor and into proper alignment with the cutter blades in a two step process to be described following explanation of the second trimming station.

In the explanation of the second cutting station 12, shown in FIGS. 8–12, like parts are identified with like reference characters. The second cutting station is of similar construction to the first with the principal exception of the number and positioning of the rotary cutter blades 26 and the presenting of the pallets so that the carrier strip material is removed from the side edges of previously separated circuit devices.

As shown in FIGS. 13 and 14, once the devices are separated at the first cutting station, carrier 19 is lowered and redeposited on the belts of conveyor 14 which is operated to shift the carrier to second conveyor 16. Conveyor 16 positions the carrier directly over a second elevator 22 which raises the carrier from the surface of the conveyor, rotates the carrier through 90° by means including a motor 90 a gear 94 and pinion 92.

Following rotation of the carrier, the elevator again deposits the carrier on the conveyor 16 which, in turn, is reactivated to move the carrier to a third conveyor 18 which positions the carrier at the second trimming station designated by the reference character 12 in FIGS. 13 and 14.

With reference to FIGS. 8–12, blades 26 are mounted on support hubs 38 which, in turn, are secured for rotation on shaft 28 by pins 39 which extend into keyways 40 extending lengthwise of the shaft. The shaft is, in turn, mounted for rotation in bearings 29 in side frame plates 30 of a rectangular frame 31. The mounting hubs for the blades are, in substance, the same as the hubs 38 described above in reference to the first cutting station. Motor 35 mounted above the blades is interconnected to the shaft 28 by means of a drive belt 36. A second motor 53 is connected to drive screw 50 by means of a belt 55 and reverses carriage 37 which is supported on rails 48 to transport the blade assembly from one side edge to the other. Blade guides 58 and 59 maintain the blades in accurate spaced apart relationship.

Figure 9:
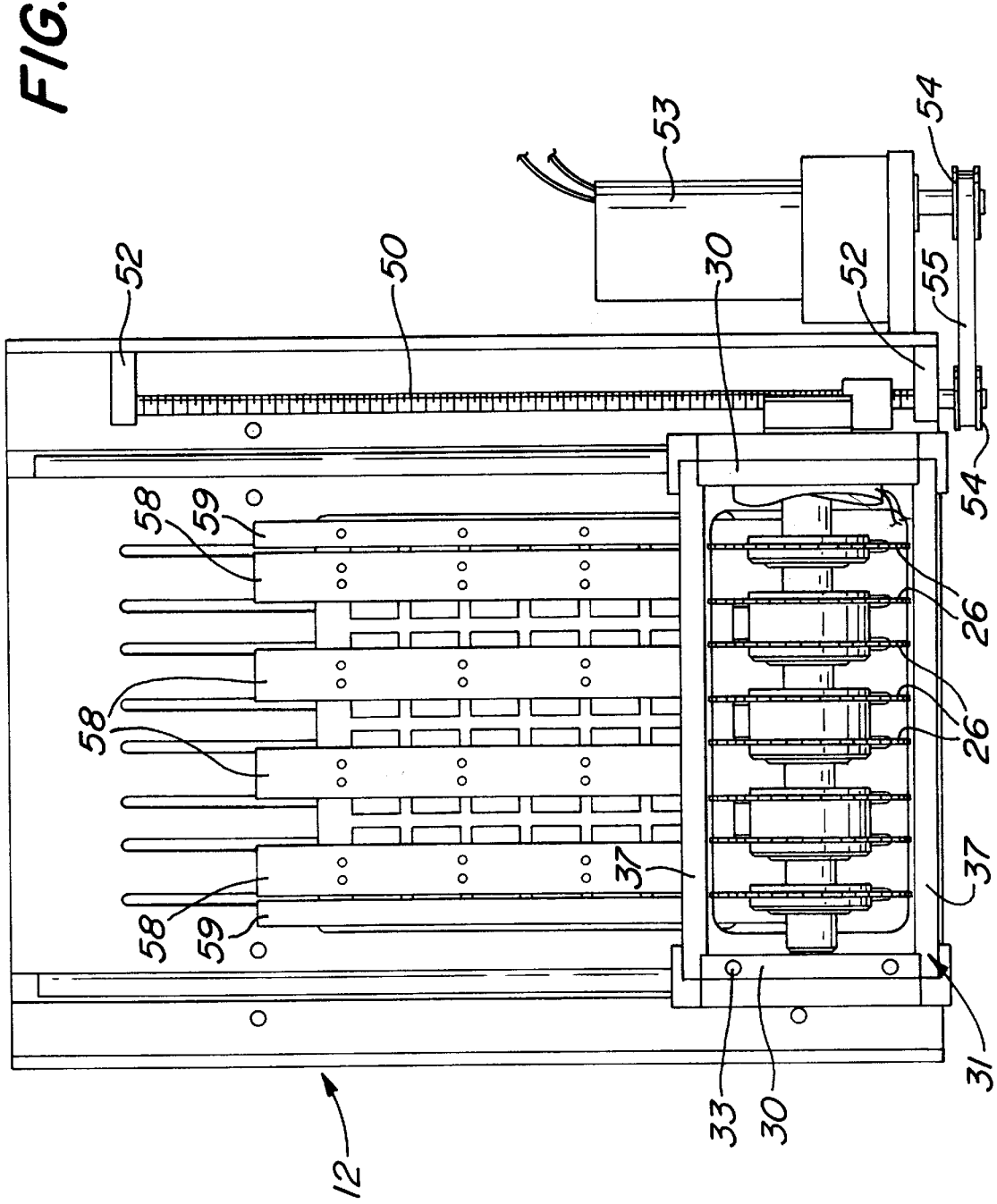
FIG. 9 is a plan view of the second cutting station according to the invention.

As particularly illustrated in FIG. 9, the blades 26 of the second cutting station are spaced to traverse the side edges of the circuit devices previously separated from four carrier strips, making eight simultaneous cuts which remove material from the side edges as the blade carriage is traversed from one end of the table to the opposite end.

Figure 10:
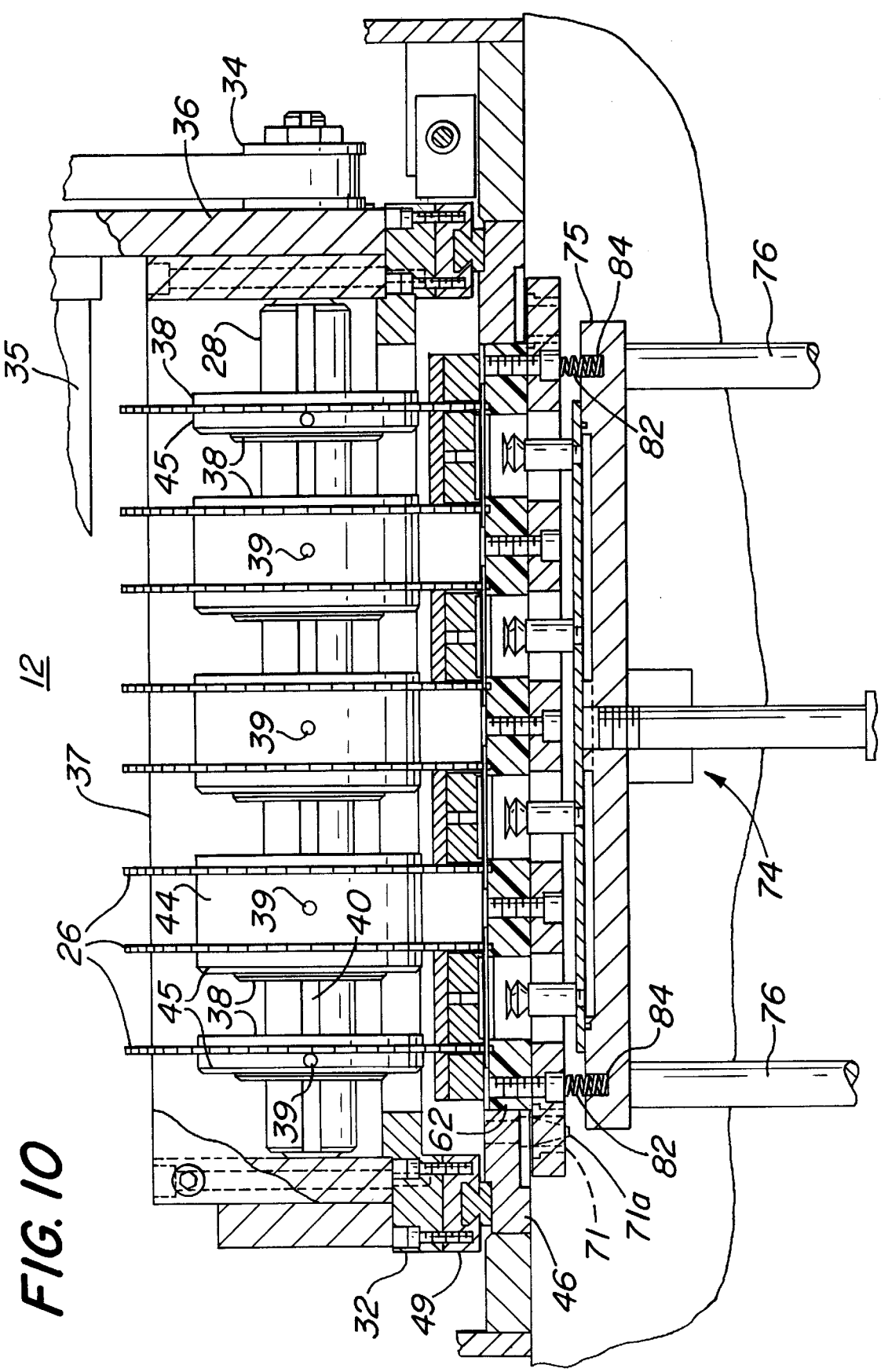
FIG. 10 is an enlarged frontal view, partly in section, of the cutting station of FIG. 8, illustrating the strip carrying pallet in an intermediate position preliminary to commencement of a cutting operation.
Figure 11:
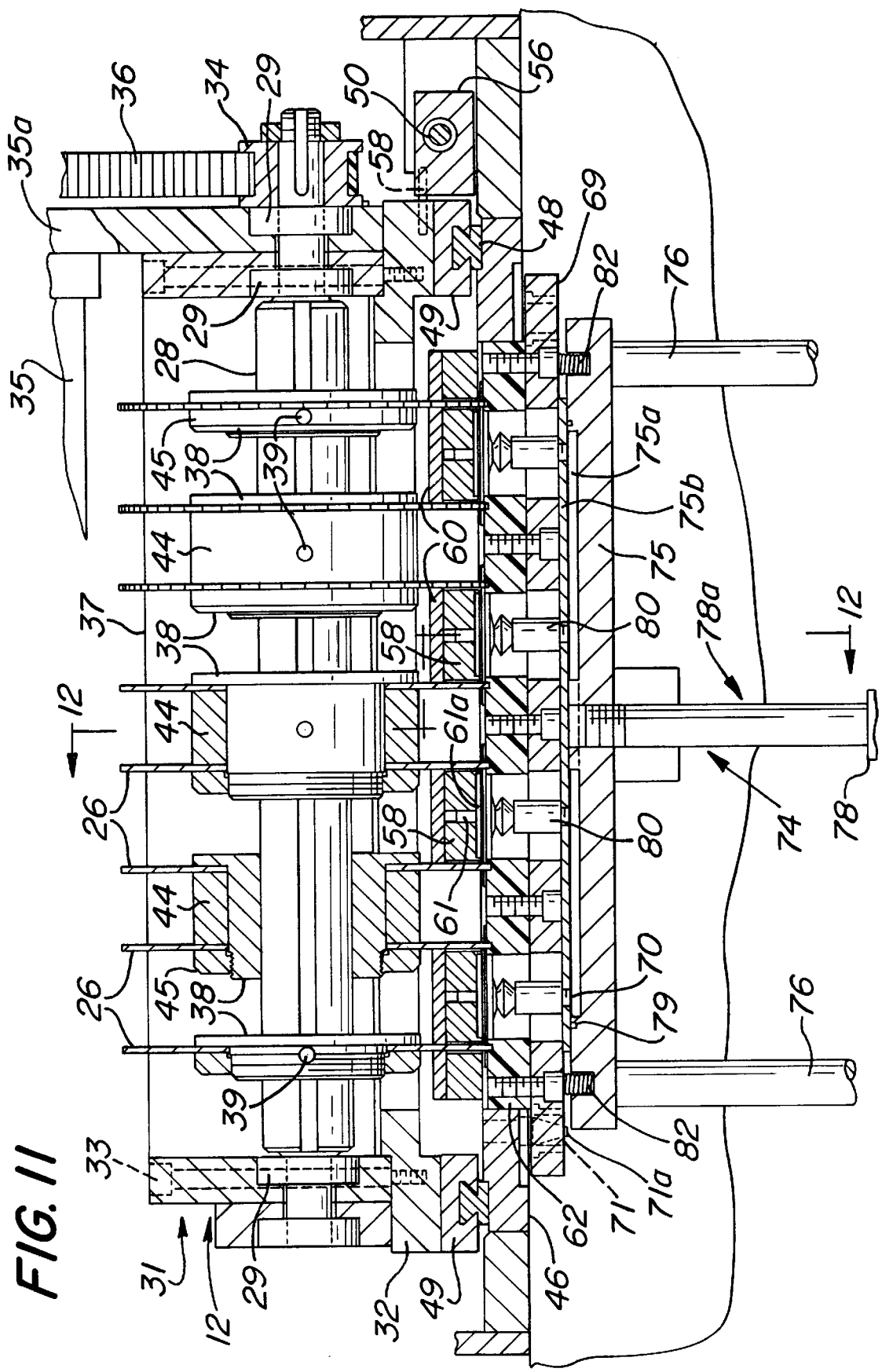
FIG. 11 is a frontal view, partly in section, similar to FIG. 3, of the cutting station of FIG. 8 illustrating the strip carrying pallet in the final position for commencement of a cutting operation.

As noted above, the proper positioning of the carrier strips with respect to the cutter blades 26 is an important feature of the invention. As can be best seen in reference to FIGS. 3, 4 and 10, plate 75 of elevator 74 is provided with four upwardly extending coil springs 82 seated in cavities 84. When the carrier 19 is located at either station 10 or 12, the springs engage the underside of plate 69, resiliently supporting the carrier as it is raised from the conveyor, allowing for a degree of lateral movement for alignment purposes. As can be seen in FIG. 10, illustrating an initial elevated position of the elevator, the pallet 62 has entered the cavity 46a of table 46 and with the springs still in their uncompressed state and registration pins 71a have entered registration openings 71, centering the pallet in the cavity. When the pallet engages the underside of table 46, the springs start to compress and suction cups 80 move upwardly within cavities 70 and 63 until they engage the downwardly facing surfaces of circuit devices 3 when the springs are fully compressed.

The final elevated position of the elevator is shown in FIGS. 3 and 12. In this position, the pallet is fully aligned within the cavity 46a, the springs 82 are completely compressed, and the suction cups 80 engage the circuit devices and draw the circuit devices tightly into the cavities in the upper carrier plate. The suction cups 80 maintain suction on the circuit devices during the ensuing cut, assuring proper registration and alignment so that an accurate cut is obtained.

To avoid damage to the circuit devices by heat generated by the cutting action, the vertical spacing of the cutting blades relative to the strip material being cut is of some criticality. Preferably, the blades should be positioned so that during the cutting operation, the blades do not penetrate an appreciable distance beyond the roots of the teeth 27. When blade penetration is so limited, the air gaps between rotating teeth act to draw sufficient cooling air into the region of the cut, preventing the build-up of excessive heat.

The operation of the apparatus of the preferred form of the invention will now be reviewed. A carrier 19 with strips carrying circuit devices is deposited on first conveyor 14 which is activated to move to a position of alignment with the first cutting station 10. Elevator 20 is then activated so that the springs engage the bottom of carrier base plate 69 elevating the carrier. Registration pins 71a enter registration openings 71 precisely positioning the floating carrier laterally so that it enters opening 46a upon continued upward movement of the elevator. When the springs 82 are fully compressed, the suction cups 80 engage the downwardly facing surfaces of the circuit devices 3 and the suction draws them tightly into cavities 63. Negative pressure maintained on the circuit devices during a cut eliminates any possibility of vibration or misalignment during the cutting action of the precisely positioned cutter blades 26. Upon full alignment, motors 35, 53 are operated to cause the cutter blades to commence rotation and to rotate the drive screw 50 to cause a traversing of the first cutter assembly lengthwise of table 46 causing the circuit devices to be separated and the excess strip material at the ends cut off. High pressure air exiting the cavities 61a within blade guides 58 removes particles of strip material created by the cutter action and cleans and cools the blades for the next cut. Following separation of the devices, elevator 20 is lowered, redepositing the carrier onto conveyor 14. The conveyor is again activated to advance the carrier 19 onto a conveyor 16 which locates it immediately above a second elevator 22. Upon positioning of the carrier 19 on conveyor 16, second elevator 22 is activated to raise the carrier from the conveyor belts of conveyor 16 sufficiently to allow rotation of the carrier 90° by rotatable means 90, 92 and 94. After redeposit on conveyor 16, the conveyor is reactivated and the carrier is then advanced to the second cutter station. As described above with reference to the first cutter station, the carrier is then raised and moved into registry with the rectangular opening 46a. The second cut is then accomplished by traversing movement of the second cutter assembly. The pallet elevator at the second station then lowers the pallet onto conveyor 18 for transport away from the cutter assembly.

The apparatus lends itself to operation by programmable microprocessor equipment including counter and positioning circuitry for sequentially operating stepping motors for feeding the carriers loaded with strips to be cut and trimmed in rapid succession to the first and second stations or for control by conventional limit-switch actuation. The apparatus of the invention permits extremely accurate cuts and produces separated and trimmed circuit devices without the need for handling by workmen and without damage to the circuit devices.

I claim:

1. Apparatus for separation of encapsulated devices mounted on elongated, substantially rectangular carrier strips in spaced apart relationship, said apparatus comprising:

a pallet having a support surface for support of said carrier strips, said pallet including carrier strip holding means for releasably maintaining said carrier strips in spaced apart, parallel relationship on said pallet support surface;

a first cutter assembly comprising a plurality of spaced apart coaxially oriented circular cutters of equal diameter, said circular cutters of said first cutter assembly lying in parallel planes and having radially extending cutter teeth;

first alignment means for aligning said pallet with said circular cutters of said first cutter assembly;

said first cutter assembly being movable relative to said pallet when said pallet is aligned by said first alignment means for movement of said circular cutters of said first cutter assembly along first predetermined parallel cutting paths, said first cutting paths being relatively positioned with respect to said pallet support surface for cutting along first cut lines adjacent to said devices for effecting separation of the devices on carrier strips supported on said pallet support surface by said carrier strip holding means;

a second cutter assembly comprising a plurality of spaced apart coaxially oriented circular cutters of equal diameter, said circular cutters of said second cutter assembly lying in parallel planes and having radially extending cutter teeth;

second alignment means for aligning said pallet with said circular cutters of said second cutter assembly;

pallet moving means for moving said pallet from said first alignment means to said second alignment means;

said second cutter assembly being movable relative to said pallet when said pallet is aligned by said second alignment means for movement of said circular cutters of said second cutter assembly along second predetermined parallel cutting paths, said second cutting paths being relatively positioned with respect to said pallet support surface when said pallet is aligned at said second station for cutting along second cut lines extending perpendicular to the first cut lines;

first operating means for operating said cutters of said first cutter assembly and for moving said first cutter assembly relative to said pallet when the pallet is aligned with said first cutter assembly to cut along said first cut lines to separate said devices between adjacent sides of said devices; and second operating means for operating said cutters of said second cutter assembly and for moving said second cutter assembly relative to said pallet when the pallet is aligned with the second cutter assembly to cut along said second cut lines, thereby trimming strip material adjacent to said devices.

2. Apparatus according to claim 1, wherein said first and second alignment means each includes negative pressure means cooperative with said holding means for holding said circuit devices on said pallet during operation of said first and second cutter assemblies.

3. Apparatus according to claim 2, wherein said holding means comprises spaced cavities in said support surface for receiving circuit devices mounted on said carrier strips, said cavities having side walls to interfit with said circuit devices for positioning said circuit devices relative to said cutter assemblies.

4. Apparatus according to claim 3, wherein said negative pressure means comprises suction cups removably positioned within said recesses for engaging with said circuit devices to hold said circuit devices during operation of said first and second cutter assemblies.

5. Apparatus according to claim 1, wherein said first and second alignment means each further includes first and second pallet positioning recesses located respectively beneath said first and said second cutter assemblies and means for sequentially positioning said pallet within said first and second pallet positioning recesses.

6. Apparatus according to claim 5, wherein said first and second operating means each comprises means for respectively moving said first and second cutter assemblies in parallel paths, and said pallet moving means includes rotatable means for rotating said pallet, whereby said pallet is rotatable from a position in which said first circular cutters are aligned with said first cut lines to a position in which said second circular cutters are aligned with said second cut lines.

7. Apparatus according to claim 6, wherein said first and second alignment means further includes elevator means including a resilient support for said pallet, downwardly extending registration means associated with said elevator means, said registration means being interengagable with said pallet upon upward movement of said elevator means for pallet alignment within said pallet positioning recesses.

8. Apparatus according to claim 7, each cutter assembly further including a rotatable drive shaft supporting the circular cutters for rotation, said cutters being adjustably mounted for movement axially on the drive shaft, and elongated blade guides disposed over the pallet positioning recesses, said blade guides having blade contact surfaces for maintaining said cutters in said predetermined cutting paths.

9. Apparatus according to claim 8, further including fluid passageways communicating with said first and second cutting paths and means for directing fluid under pressure through said fluid passageways to said cutting paths.

10. Apparatus according to claim 1, wherein said circular cutters of said first and said second cutter assemblies are formed of carbide steel.

11. Apparatus according to claim 1, wherein said pallet support surface further includes first and second sets of blade guide grooves, for receiving said blades, said guide grooves of the second set being perpendicularly disposed on said surface with respect to the guide grooves of said first set, said circular cutters of said first cutter assembly being spaced to project into said first set of guide grooves when said pallet is aligned with said first cutter assembly and said circular cutters of said second cutter assembly being spaced to project into said second set of guide grooves when said pallet is aligned with said second cutter assembly, said holding means further including cavities on said support surface positioned between said intersecting first and second guide grooves for receiving the devices on said carrier strip.

12. Apparatus according to claim 11, wherein said cavities extend through said pallet, and said first and second alignment means each includes suction devices projecting upwardly through said cavities for application of negative pressure on said devices on said carrier strips.

13. Apparatus according to claim 11, wherein the cutter teeth have root portions which pass above said pallet support surface when the teeth are within said blade guide grooves.

14. Apparatus for separation of encapsulated devices mounted on elongated, substantially rectangular carrier strips in spaced apart relationship, said apparatus comprising:

a pallet having a support surface for support of said carrier strips, said pallet including holding means for releasably maintaining said carrier strips on said support surface in spaced apart, parallel relationship;

a pair of cutter assemblies for cutting the carrier strips along first and second sets of cut lines, each of said cutter assemblies comprising a plurality of spaced apart coaxially oriented circular cutters of equal diameter, said cutters being in parallel relationship and having radially projecting cutter teeth;

first alignment means for aligning the pallet with a first cutter assembly of said pair, first operating means for operating the cutters of said first cutter assembly and for moving said first cutter assembly relative to said pallet for effecting cuts of said strip material on said support surface along said first set of cut lines, second alignment means for aligning the pallet with a second cutter assembly of said pair, pallet moving means for moving said pallet from said first alignment means to said second alignment means, and second operating means for operating the cutters of said second cutter assembly and for moving said second cutter assembly relative to said pallet for effecting cuts of said strip material on said support surface along said second set of cut lines, whereby cutting along one of said sets of cut lines effects separation of said devices and cutting along the other of said sets of cut lines effects trimming of the strip material along edges of said devices extending perpendicularly to said one set of cut lines.

* * * * *